Oct. 10, 1967　　　　　　E. H. MANNY　　　　　　3,346,249
GASEOUS FUEL CONTROL SYSTEM AND APPARATUS FOR FURNACES
Original Filed Dec. 1, 1960

ERWIN H. MANNY　　INVENTOR

BY　*W. O. Heilman*

PATENT ATTORNEY

United States Patent Office 3,346,249
Patented Oct. 10, 1967

3,346,249
GASEOUS FUEL CONTROL SYSTEM AND
APPARATUS FOR FURNACES
Erwin H. Manny, Cranford, N.J., assignor to Esso Research and Engineering Company, a corporation of Delaware
Original application Dec. 1, 1960, Ser. No. 73,000, now Patent No. 3,210,181, dated Oct. 5, 1965. Divided and this application Dec. 17, 1964, Ser. No. 418,993
3 Claims. (Cl. 266—29)

ABSTRACT OF THE DISCLOSURE

An apparatus for controlling the injection of gaseous fuels and blast air into a blast furnace, which apparatus assures positive gas flow to the blast furnace at all times in step with blast air temperature and volume by maintaining a positive pressure differential of the gas over the blast air.

The present invention relates to a fluid control apparatus and method for furnaces. In particular, the invention concerns an apparatus and process for controlling the injection of gaseous fuels and blast gases into a furnace, and more particularly, the controlling of the injection of natural and refinery gases and heated blast air into a blast furnace. This application is a divisional application of application Serial No. 73,000, filed December 1, 1960, now Patent No. 3,210,181, which is a continuation-in-part of application Serial No. 38,852, filed June 27, 1960, now Patent No. 3,228,764.

In the operation of a conventional blast furnace, the furnace is charged with iron ore (iron oxides), flux materials (limestone) and carbonaceous materials (coke). This mixture is then heated to drive off carbon dioxide and water, and as the ore descends downward through the stack, it is reduced to iron by reducing gas moving in a countercurrent direction. The reduced iron is then melted in the lower bosh portion of the furnace, and the liquid metal withdrawn through the iron notch at the hearth. A blast furnace thus requires a source of reducing gas in the upper part of the stack to reduce the ore and, a high temperature in the lower part of the stack (bosh section) sufficient to melt and liquify the reduced ore. Both requirements are generally provided for by introducing a heated air or an oxygen-enriched air mixture through a series of circumferential tuyeres located near the bottom of the furnace. The air blast combusts with the coke to furnish the necessary high temperature to melt the iron (2,500 to 3,000° F.) and a reducing gas (carbon monoxide) to reduce the ore further up the stack.

It is known in the art that hydrocarbon fuels may be used as a partial replacement for coke in the blast furnace. Suitable fuel for this purpose would include any liquid, liquefiable, gaseous or emulsifiable hydrocarbon fuel product. Gaseous hydrocarbon fuels suitable for use in blast furnaces and with the present control system include natural gas, acetylene, blast furnace by-product gas, water gas, carbureted water gas, coal gas, coke oven gas, hydrogen, oil gas, reformed gas, light petroleum gases, producer gas, petroleum refinery gases, and the like. Suitable gaseous fuels are more fully set forth in the Chemical Engineer's Handbook, 3rd edition, pp. 1575–1596. These gaseous fuels are most suitably utilized by injecting them in conjunction with the heated blast air either through the tuyeres or near the tuyeres into the lower or bosh portion of the blast furnace, cupola, open hearth furnace, or other furnace to produce high temperatures and suitable reducing gases.

The problems associated with the injection of gaseous fuels and the efficient operation of a blast furnace involve the close control of certain blast furnace variables. It is important that the injection of the gaseous fuel be closely controlled so that the injection of excessive fuel at the blast air temperature employed will not upset the furnace operation. High temperatures will allow the partly reduced ore in the upper part of the shaft to become pasty, slump together, and reduce or cut off the passage of the blast and reducing gases, thus choking the furnace, while even higher temperatures may destroy the furnace by causing the lining to slag. Low temperatures also must be avoided in order not to freeze the furnace, thereby causing uncontrolled cooling with consequent failure of the material to move down the stack and possible destruction of the furnace lining. The correct operation of the furnace is usually the responsibility of the furnaceman, who by visual observations of the furnace operations through the peephole in each individual tuyere, and the data available maintains the furnace at the optimum conditions, detecting and correcting operating difficulties.

Control of operating conditions has in the past been usually affected by controlling the volume, temperature, moisture and other factors of the blast air. The injection of gaseous fuels with the blast air creates novel, additional and critical problems in the proper control of fuel flow, air blast flow, temperatures, the detection of operating difficulties, safety hazards and the like. Thus, for example, blast air and fuel flow must be maintained in certain critical operating proportions to ensure proper operating temperatures. The cutoff or reduction in flow of the fuel or blast must be accompanied by a suitable reduction or cutoff of the other component, otherwise operating temperatures may not be suitable for proper furnace operation. In addition, the plugging of individual tuyeres by coke, slag, iron or carbonaceous material, and the burning of gaseous fuel in the individual tuyere, must be detected and corrected promptly for efficient operation. Another problem in the use of gaseous fuels is that the blast air temperature must be higher to achieve maximum coke reduction than conventional blast air temperature. Preferably the air blast temperature should be at least 1000° F., with a range of 1400° F. to 2400° F., the present maximum practical, especially preferred with gaseous fuels. This is necessary since the initial cracking reaction of the relatively cold gaseous fuel with the air blast produces less heat then that produced with coke, the total heat quantity of which varies according to the fuel used. In order to reduce any absorption of heat from the bosh section at high gaseous fuel injection rates, the temperatures of the air blast must be increased. To avoid initial lower temperature effects in the furnace, the temperature of the blast air must preferably then be kept above a certain predetermined temperature level to achieve maximum reduction in coke consumption. Thus, blast air temperature and fuel flow must be closely correlated for efficient operation. The approximate steady uniform injection and distribution of gas at all the tuyeres is another requirement of proper fuel injection to ensure good blast furnace operation. Of course, the handling of combustible gases also requires that certain safety requirements be observed so that fuel flow is not uncontrolled. These and other problems associated with the use of gaseous fuel render the conventional operation of furnaces entirely by the judgment of the furnaceman, with limited observation and data, quite inefficient and subject to gross errors with resulting disaster to furnace and operations and to the furnace itself.

A control system applicable to gaseous fuels is proposed which ensures satisfactory operation under safe conditions. In particular, the gaseous control system incorporates control means to assure positive fuel flow to the blast furnace at all times in step with blast air flow and temperature.

It is therefore an object of the present invention to provide a method and apparatus for the proper detection and control of certain critical variables in the operation of furnaces utilizing a gaseous fuel-air injection system. Other objects are the proper control of gaseous fuel flow and blast air flow in blast furnaces, individual tuyeres, the maintenance of gaseous fuel flow with certain minimum air blast temperature, and the maintenance of positive gas flow to the blast furnace. These and other objects as well as the nature and scope of the instant invention will be more apparent from the following drawings and description.

The present invention will be more fully understood by reference to the accompanying drawings wherein.

Figure 1:
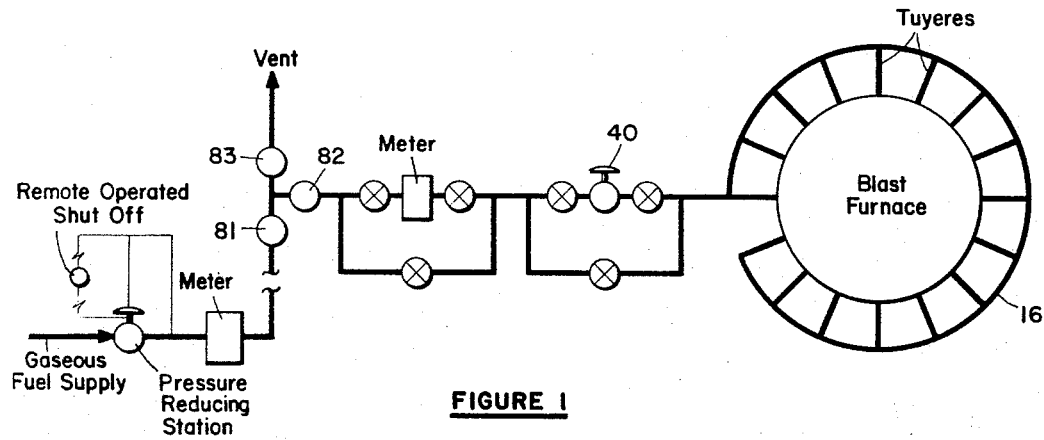
FIGURE 1 is a diagrammatical representation of a gas piping and control system for blast furnaces.

Referring now to FIGURE 1 in more detail, there is shown a system for the introduction of gas into a blast furnace wherein the gas, such as natural or refinery gas supplied at a high pressure, is reduced to between 25 to 100 p.s.i.g. and preferably to about 60 p.s.i. at a pressure reducing station. Valve means for a remotely operated shutoff of the gas supply are built into the pressure reducing valve to provide safe and positive isolation of the fuel supply from the blast furnace during shutdown. Meter means are also provided to provide a measure of total fuel flow. The relatively low pressure gas is then fed through a main supply line to a shutoff and vent cock arrangement, a meter with a bypass, and a fuel controller 40 and then to a gas ring manifold 16, which circumferentially surrounds the blast furnace, preferably about the bosh section. Radially inwardly extending from the gas ring manifold are individual gas injection pipes into or near each individual tuyere of the blast furnace. To obtain uniform and steady distribution of the gaseous fuel contacting the ore, coke, and flux stock in the furnace, uniform amounts of gas must be injected at each individual tuyere. Since the blast furnace usually operates at pressures between 20 and 30 p.s.i.g., the fuel supply system must be properly designed to deliver sufficient gaseous fuel within the 30 to 40 p.s.i. pressure drop. The gas ring manifold must be sized for little or no pressure drop between the gas inlet and the last tuyere to ensure uniform distribution of gases in the furnace using the same external tuyere orifices. Of course, the blast air injected into the blast furnace is always at a higher pressure than the blast furnace pressure, so that by maintaining the fuel at a positive differential above the blast air the fuel pressure will additionally be above the furnace pressure.

Although the control system described herein contemplates control of the total flow of air blast and gaseous fuel, gas-air proportioning may also be accomplished at each individual tuyere at increased cost. The approximate maximum quantity of natural or refinery gas used by blast furnaces of different capacities and the required pipe sizes of the supply line are shown in Table I.

TABLE I

| Blast Furnace Production, Tons Hot Metal/D. | Natural Gas Consumption, 1,000 s.c.f./D. | Approximate Pipe Size, Inches |
| --- | --- | --- |
| 500 | 2,500 | 2 |
| 1,000 | 5,000 | 2.5 |
| 1,500 | 7,500 | 3 |
| 2,000 | 10,000 | 3 |

Figure 2:
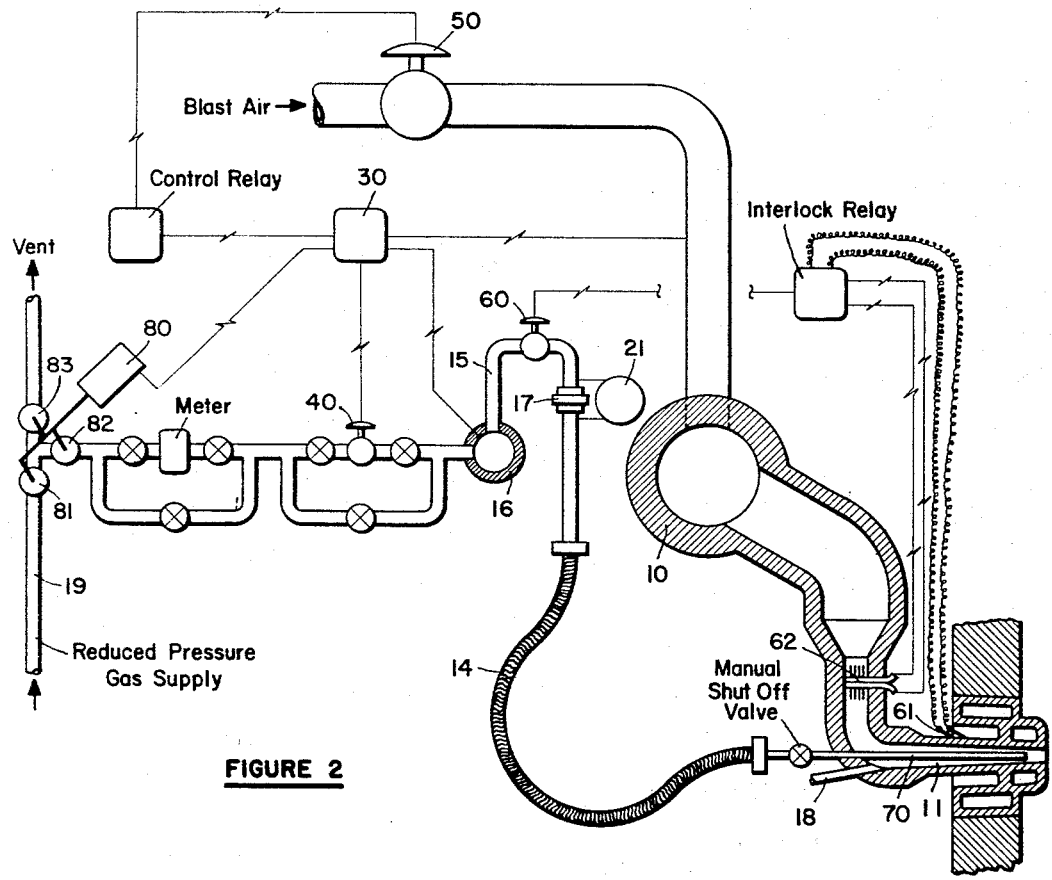
FIGURE 2 is a diagrammatical representation of the inventive gaseous fuel-air blast control system for a blast furnace.

Referring now to FIGURE 2, there is shown a preferred fuel-air injection control system with a sectional view of an individual tuyere, wherein preheated atmospheric air or oxygen enriched air at about 50,000 to 100,000 cu. ft./min. at a higher then atmospheric pressure, for example, 25 p.s.i.g., is forced through a bustle pipe 10, which circumferentially surrounds the blast furnace. An individual tuyere blowpipe 11 communicates through an elbow and a gooseneck with the bustle pipe and provides means whereby the blast air is admitted into the blast furnace. Within the individual tuyere chamber or blowpipe is located a fuel injection pipe 70, the outside end of which extends through the elbow and has a manual shutoff valve. The fuel injection pipe could, if desired, be located outside of the tuyere, but adjacent to the tuyere to ensure proper combustion conditions.

The fuel injection pipe can be a straight tube injection pipe as shown, or, if desired, a fluid shrouded tube, for example, a shrouded air cooled tube. The latter nozzle would be suitable and preferred since the heated blast gas (about 2,000° F.) and furnace heat of the raceway (about 3,400° F.) are sufficient to cause excessive carbonization and thermal cracking of the gaseous fuel, along with the hazard of auto-ignition of the gas-air mixture. Thus, the latter nozzle comprising an annular-type tube or duct-type conduit or its equivalent surrounding the fuel injection pipe would be desired. By passing relatively cool air through the surrounding tube, the gaseous fuel being injected would be protected from excessive heat effects and carbonization and auto-ignition of the mixture inhibited. The protecting air flow and pressure would be such that on stoppage of the fuel flow, the air effect on the furnace temperature conditions would be negligible. A suitable fluid shroud would be air having a temperature of from 60–150° F. at a pressure of from 2–10 pounds per square inch.

The outside end of the injection pipe is connected to a braided corrugated flexible metal tubing 14, which communicates in turn with an individual tuyere gas supply line 15 which is further connected to the gas ring manifold 16, where the gaseous fuel is under suitable positive pressure at least 1 p.s.i. above the pressure of the blast air pressure. The ring manifold is supplied gaseous fuel by a main gas supply line 19 at pressures ranging between 25 and 75 p.s.i.g. and preferably about 60 p.s.i.g. The corrugated tubing 14 permits quick disconnection of the fuel injection pipe and convenient access to the individual tuyere. Located below the injection pipe in the elbow is the conventional eyesight or peephole 18, whereby the furnace conditions are observed by the furnaceman. In the fuel supply line is located a differential pressure gauge 21, positioned across an orifice 17, whereby any obstruction in the individual gas injection pipe of the tuyere resulting in an unequal fuel distribution with other individual tuyeres will be promptly detected by a change in pressure across the orifice, and the furnaceman alerted by an alarm, e.g. signal light, that the injection pipe is plugged or partially clogged and must be cleaned to restore normal flow. Although steam or air purge means to purge the individual fuel injection pipes on shutdown of the fuel supply are not shown, they may be incorporated as described in the parent application when excessive carbonization of the gaseous fuel requires it.

The gaseous fuel supply to the ring manifold is controlled by a fuel flow recorder-controller 40, the blast air to the bustle pipe by a blast air controller 50 and the pressure difference between the blast air and gaseous fuel maintained by a differential pressure controller 30, all of which controllers communicate and interlock with a control relay as shown. The controllers are any suitable flow control means capable of manual or automatic operation from a control relay system. Suitable controllers would thus include diaphragm, power cylinder, or electric motor operated steam, air, or liquid flow controllers or flow recorder-controllers of the globe or V port-type which are well known in the art. The preferred controllers are a standard globe valve flow control apparatus operated by pneumatic means. Suitable controllers include those set forth in the ASME Mechanical Catalogue of 1960, particularly FIGURE 13, page 43; and in the December 1949 issue of Power, pages 71–106 and in particular FIGURE 3 of page 101. Control of the blast air can also be accomplished in the conventional manner by regulating the speed of the air blower or by venting of the air blast to the atmosphere. The fuel flow controller can be modified slightly to provide for visual or graphic recording means for observing the quantity of fuel being used or used during a certain period of time. The blast air and fuel flow are capable of manual control by the furnaceman or can be automatically controlled by the control relay. The control relay can be any suitable mechanical, hydraulic, electronic and the like, relay system which will interlock with the controller used so as to perform the functions intended. These types of control relay systems like the controllers are well known to those skilled in the art. Suitable control relays would include pneumatic relays such as the "Standatrol" type, a proportioning diaphragm pneumatically operated, relay manufactured by the Bailey Meter Company, and electronic relays such as the magnet bar type. Suitable and preferred relays are further listed in the ASME Mechanical Catalogue of 1960 on page 43, FIGURE 10 (pneumatic type) and in the December 1949 issue of Power on page 88, FIGURE 5 (pneumatic type) and page 104, FIGURE 2 (magnet bar type). With the gaseous fuel control system shown, the use of a compressed air-operated control relay would be most economical and preferred.

Communicating with the differential pressure controller and located in the main fuel supply line is a valve control mechanism 80 which operates to open and close simultaneously shutoff valves 81 and 82 and to open valve 83 to vent or discharge the gaseous fuel to the atmosphere when the shutoff valves are closed. This shutoff and vent valve arrangement reduces safety hazards, for example, gas leaking and the like, attendant with the use of the gaseous fuels by providing a positive shutoff and safe venting of the gas at a distance from the blast furnace. The valves 81, 82 and 83 are interconnected to operate in sequence with one another. The valve control mechanism may be a valve-driven mechanism as shown operating by impulses received from the differential pressure controller or the fuel controller. Suitable valve mechanisms would thus include mechanically, electrically, and hydraulically operated solenoids and other means more known to the art.

The differential pressure controller is interlocked with the control relay and the fuel controller. The pressure controller operates to assure that a positive gas flow to the blast furnace will be maintained at all times. The pressure controller continuously monitors the pressure of the blast air in the bustle pipe and controls the gaseous fuel in the ring manifold as shown to a predetermined differential pressure, usually between 1 and 50 p.s.i.g., for example, 2 p.s.i., of the gaseous fuel over the blast air. Economic reasons would indicate a preference for a rather low pressure differential. The differential pressure controller thus communicates with the fuel controller, and provides for the stoppage of fuel flow when a positive predetermined pressure differential cannot be maintained over the blast air. This pressure controller thus operates to override the fuel controller when the preset fuel-air ratio of the control relay attempts to throttle gaseous fuel below the preset positive pressure differential. This action assures that blast air will not backflow through the gaseous piping system and create hazardous air-gas explosive mixtures. When the pressure controller actuates to close the fuel controller or if the control relay, upon failure or reduction of the blast air volume or temperature, closes the fuel controller, the valve drive mechanism is also actuated and the shutoff valves close and the vent valve opens. The differential pressure controller only functions when positive gas flow to the furnace is threatened.

In the automatic operation, the blast air controller and the fuel controller are interlocked through the control relay so that the fuel controller will close (fail-safe) on low blast air pressure or flow as indicated by low pressure or flow in the bustle pipe. In addition, the fuel controller will close at a predetermined minimum blast temperature level or, if this is desired, to be left to the judgment of the furnaceman, appropriate visual or aural signals can call his attention to lower blast air tempertures. The interlocking operation of the fuel and blast air controller will thus prevent safety hazards from occurring, and prevent the furnace from freezing or otherwise malfunctioning. The control relay by measuring the flow rates and pressures can also maintain a proper preselected fuel/air ratio. When blast air is modulated in volume, the fuel flow will be automatically reduced or increased in flow to maintain a proper fuel/air blast ratio. Any attempt to modulate fuel flow below the predetermined presure differential will be prevented by the differential pressure controller. When blast air flow is reduced or shut off, such as in the tapping cycle, the fuel flow recorder-controller will automatically shrut off the fuel supply. Manual means of overriding this control can be provided to permit the flow of gaseous fuel at reduced blast air flow. Manual control through the control relay also allows the furnacemen, upon resumption of operations, to delay the injection of fuel to the furnace until furnace conditions are satisfactory.

The fuel controller permits the desired quantity of fuel to flow provided sufficient differential exists between the gas and the blast air in the system. When no differential exists as in the startup operation, means are provided to override the differential pressure controller to permit the fuel controller to operate. Thus, in essence, a control system is provided whereby a preselected air-fuel ratio in step with furnace conditions is provided. Upon failure of the blast air, reduction of the blast air temperature or volume below a preselected minimum, e.g., 1800° F., or failure or reduction in gaseous fuel supply, the fuel controller, through impulses received by the control relay, stops the flow of fuel and the valve mechanism is simultaneously actuated by closing the shutoff valves and opening the vent valve. In this operation, manual controls are also provided to allow the furnaceman to alter conditions to suit furnace operation. The fuel flow is also continuously monitored by the differential pressure recorder to ensure a positive flow of gaseous fuel to the furnace, so that the differential pressure controller will override the fuel controller and stop gas flow only when the pressure is reduced below the safety margin.

An individual fuel safety controller 60 is located in the fuel supply line between the gas ring manifold and the individual tuyere and interlocked by an interlock relay shown to a thermocouple 61 and a pitot tube 62 in each individual tuyere. The interlock relay as shown is a standard relay control and can be any suitable mechanical, hydraulic, electronic means capable of performing the functions described. Suitable interlock relays would include those relays as described for the control relay since the function and structure of the interlock relay is the same as the control relay except that interlock relay operates on individual tuyere lines rather than on the total gaseous or blast manifold flow. This interlock relay is designed to shut off the fuel supply to the individual tuyere and signal the furnacemen upon the stoppage of blast air or burning within the tuyere or blowpipe. The pitot tube, orifice plate, or other air flow measuring device installed in each tuyere operates to indicate the blast air flow, and that the tuyere is not plugged or partially clogged. When the tuyere becomes plugged by coke, slag, molten iron, and the like, the drop in differential pressure actuates the relay to shut off the individual fuel supply to that tuyere. In the absence of such control, there will be no simple way of detecting the stoppage of air flow; thus combustible gas will continue to flow and fill the tuyere, creating a safety hazard. The pitot tube controls detect this occurrence, stop the fuel flow and notify the furnacemen. In addition, the blast air flow in the tuyere as monitored by the pitot tube through the interlock relay maintains the correct individual tuyere fuel/air relationship. This is particularly important since the air flow in each individual tuyere varies considerably depending upon the internal furnace conditions such as channelling and the like. The location of a thermal sensing means, such as a switch or thermocouple, in each individual tuyere prevents gas from burning in the tuyere undetected. The high temperature of the air blast and the raceway makes individual fires in the tuyere with subsequent destruction of the slender injection pipe a real danger. Thus, upon an increase in temperature in the tuyere detected by the thermocouple in the blast pipe, the individual fuel supply is automatically shut off through the interlock relay, by the fuel safety controller, and the furnaceman's attention is called to the situation by a signal alarm system.

The inventive control system described solves many of the novel and intricate problems in the utilization of gaseous fuels in furnaces. In particular, the inventive system assures positive gas flow to the blast furnace at all times in step with blast air temperature and volume and reduces the hazards of combustible gas-air mixtures.

What is claimed is:

1. An apparatus for the control of the gaseous fuel-blast air flow in a furnace provided with a bustle pipe and a tuyere located on the side of the furnace so as to permit heated blast gases to flow through the bustle pipe and into the tuyere for injection into the furnace, which apparatus comprises in combination: a fuel source; a gas ring manifold fed by the fuel source; a fuel injection pipe communicating with the ring manifold whereby gaseous fuel is allowed to flow from the ring manifold into said injection pipe; means to measure the blast air temperature; a blast air flow recorder-controller; a fuel flow recorder-controller; a differential pressure recorder-controller, which controller monitors the pressure differential between the air blast of the bustle pipe and the fuel in the ring manifold; a control relay which is interlocked with the blast air, fuel flow and differential pressure recorder-controllers and the temperature measuring means; means to monitor the recordings of the recorder-controllers and temperature measuring means to the control relay; means whereby said control relay actuates the fuel controller and stops fuel flow when one of the following functions occurs: (a) upon reduction in the blast air temperature to any predetermined value; (b) upon reduction of the blast air flow to any predetermined value; and (c) upon reduction of the gas pressure in the ring manifold to any predetermined positive pressure differential from that of the blast air in the bustle pipe.

2. An apparatus as defined in claim 1 wherein said fuel injection pipe is located within the tuyere.

3. An apparatus as defined by claim 1 wherein said apparatus contains additionally a valve control mechanism interlocked with said control relay through the differential pressure recorder controller and means for transferring signals from the differential pressure recorder-controller to the valve control mechanism, whereby said valve mechanism upon closing of the fuel controller actuates shutoff and vent cocks in the fuel supply line to provide positive shutoff of the gas supply and vents gas between the blast furnace and the valve mechanism to the atmosphere.

References Cited

UNITED STATES PATENTS

| | | | |
|---|---|---|---|
| 1,620,240 | 3/1927 | Smoot | 158—119 |
| 2,072,384 | 3/1937 | Schmidt | 137—91 X |
| 2,087,842 | 7/1937 | Gerwig | 266—41 |
| 2,388,669 | 11/1945 | Baker | 137—88 X |
| 2,605,180 | 7/1952 | Totzek | 266—30 X |
| 2,719,083 | 9/1955 | Pomykala | 75—42 |
| 2,879,056 | 3/1959 | Wagner | 266—29 |
| 2,916,022 | 12/1959 | Arant. | |
| 2,962,094 | 11/1960 | Wallace | 158—42.2 X |
| 2,980,416 | 4/1961 | Strassburger | 266—30 |
| 3,116,143 | 12/1963 | Reichl | 266—41 X |

JOHN F. CAMPBELL, *Primary Examiner.*

R. F. DROPKIN, *Assistant Examiner.*